United States Patent [19]

Pack

[11] Patent Number: 5,040,486

[45] Date of Patent: Aug. 20, 1991

[54] SYMBIOTIC PRODUCTION METHOD FOR MICROALGAE AND FISHES

[75] Inventor: Moo Y. Pack, Seoul, Rep. of Korea

[73] Assignee: Korea Advanced Institute of Science & Technology, Seoul, Rep. of Korea

[21] Appl. No.: 452,391

[22] Filed: Dec. 19, 1989

[30] Foreign Application Priority Data

Dec. 20, 1988 [KR] Rep. of Korea ............... 17072/1988
Oct. 20, 1989 [KR] Rep. of Korea ............... 15141/1989

[51] Int. Cl.$^5$ ............................................. A01K 61/00
[52] U.S. Cl. ........................................................ 119/3
[58] Field of Search ............................................ 119/3

[56] References Cited

U.S. PATENT DOCUMENTS

| | | | |
|---|---|---|---|
| 3,916,832 | 11/1975 | Sweeney | 119/3 X |
| 4,137,868 | 2/1979 | Pryor | 119/3 X |
| 4,144,840 | 3/1979 | Bubien | 119/3 |
| 4,394,846 | 7/1983 | Roels | 119/3 X |

*Primary Examiner*—Robert P. Swiatek
*Attorney, Agent, or Firm*—Cushman, Darby & Cushman

[57] ABSTRACT

A method for producing biomass of microalgae and fishes economically by establishing a symbiotic relation between the above two organisms in a culture pond exposed to sunlight or artificial illumination.

8 Claims, No Drawings ature of microalgae. In contrast to heterotropic bacteria and yeasts which require organic nutrients for their growth, photosynthetic microalgae grow on inorganic materials which are not directly related to human food or animal feed. Only carbon dioxide, water, and minerals are needed as raw materials for mass production of microalgal SCP provided plenty of light is available. Water and minerals are cheap, but the cost of carbon dioxide is high. Carbon dioxide may be supplied by blowing air into the culture pond, but the carbon dioxide content in air is only 0.03%, while microalgae need 2 to 5% of carbon dioxide for their optimum growth. For mass production of microalgae it has been a normal process to burn petroleum for carbon dioxide. Soeder (1978) estimated US$2,000 for carbon dioxide to produce one ton of dry algal biomass. One ton of soybean meal was sold at US$237 in 1984 (Senez, 1986). This is the main reason why microalgal SCP does not appear in the world feed market yet.

SYMBIOTIC PRODUCTION METHOD FOR MICROALGAE AND FISHES

BACKGROUND OF THE INVENTION

The present invention relates to a method for the economical production of non-toxic biomass through a high density symbiotic culture between microalgae and fishes, in which fishes provide dissolved carbon dioxide, inorganic nitrogen, physical agitation, and removal of contaminated protozoa benefical to the microalgae, while microalgae provide dissolved oxygen, nutrients, and consumption of excreted compounds to clean the water beneficial to the fishes.

Since the 1960's much attentions and extensive efforts have been devoted to the production of single cell protein (SCP) to solve the increasing problem of world food shortage. However, the high production cost has always excluded SCP products from the feed market. Toxicological concern relating to petroleum-based SCP is also problematic for products to be accepted as feed or food. Attempts to produce microalgal dry biomass containing about 50% protein had been initiated even earlier than those for bacterial or yeast SCP. Again the high production cost has discouraged the microalgal food programs, and recently the general research trend toward microalgal production appears to have shifted from the production of low value —high volume products to the production of high value —low volume products including pharmaceutical and specialty chemicals.

The high cost of carbon dioxide accounts for the main part of the production costs for microalgal biomass. Costs for agitation, recovery of cells, nitrogen sources, and minerals should be also included in the production costs. In a large-scale outdoor culture of microalgae, contamination and overgrowth of protozoa often cause serious problems.

SUMMARY OF THE INVENTION

Therefore, it is an object of the present invention to provide a method for producing microalgae and fishes symbiotically which is capable of mass-producing microalgae and fishes which are used for feed, food or chemical source material and of using the same area and facilities for both microalgae and fishes.

Another object of the present invention is to provide a method for producing microalgae and fishes economically which is possible by harvesting algae without using a separate apparatus such as a centrifugal separator by culturing filamentous microalgae in only an upper zone of a pond provided with upper and lower zones.

Still another object of the present invention is to provide a method for producing microalgae and fishes which permits easy drying of the harvested algal biomass by sunlight or wind.

According to the present invention, dissolved carbon dioxide required for the growth of microalgae is supplied through respiration of fishes, and ammonia and inorganic salts which are nitro9en sources are supplied through the excretions of fishes and remaining feeds as well as agitation needed to distribute the microalgae evenly in the water are provided by the swimming motion of fishes.

Furthermore, since protozoa thriving in the pond water are prevented by predatory activity of fishes, economical mass production of microalgae can be achieved, and oxygen needed for the respiration of fishes is supplied through photosynthesis of microalgae, and contamination of water due to the excretions of fishes according to the high density symbiotic culture of fishes can be prevented by the metabolism of microalgae.

DETAILED DESCRIPTION OF THE INVENTION

According to the present invention, the culture pond is basically of an open type, the microalgae are of any kind which grow in the open pond predominantly, and the fishes are of any kind which adapt well in the culture pond.

The reduction of costs for producing microalgal biomass as well as prevention of protozoal overgrowth can be achieved by growing microalgae together with fishes in the same pond.

Carbon dioxide in nature comes mainly from respiration of organisms. Natural waters such as stream, river, lake, and ocean contain carbon dioxide, a substantial part of which comes from respiration of fishes living in the water. Microalgae in the natural waters use the carbon dioxide for their growth, but again the carbon dioxide content in the waters is suboptimal because fish density in such waters is usually low.

It is theoretically possible to raise the dissolved carbon dioxide content in the water to the level required for optimal growth of microalgae simply by increasing the fish density. A high density fish culture requires high rate of oxygen supply and continuous removal of excreted materials or metabilites of fishes which are toxic to the fishes. Such requirements may be met in part by establishing symbiosis between fishes and microalgae in a culture pond.

When microalgae and fishes are grown together at high densities in a pond which is exposed to sunlight or artificial illumination, a large amount of carbon dioxide liberated from respiration of the high density fishes is readily utilized by the high density microalgae as carbon source for photosynthesis. The concentration of carbon dioxide dissolved in the water can be controlled by adjusting the density of fishes to be used for the symbiotic culture.

The use of fish respiration based carbon dioxide as carbon source for microalgal biomass production has particular significance in three aspects; 1) carbon source of low cost, 2) carbon source of free-toxicity, and 3) carbon source of universal and endless supply.

In SCP production, petroleum-based hydrocarbons have been considered as the most suitable carbon source due to their availability in large quantity and to their relatively low cost. Nevertheless, the raw material cost for alkane-based SCP and for methanol based SCP equates to 39.2% and 75.6%, respectively, of their commercial values (Senez, 1986). When the microalgal SCP production is combined with fish culture, carbon dioxide can be supplied at needed level of concentration at free cost, even at negative cost if the income from fish product is taken into account. This will allow microalgal SCP to complete with soybean meal in the feed market.

The carbon dioxide liberated from fishes through respiration should be free of toxicity, otherwise fishes must have been killed. Thus, microalgal SCP produced through the symbiotic culture with fishes will be also non-toxic. This is in sharp contrast to the petroleum-based hydrocarbon grown SCP products which have been faced to strong politico-social resistance with regard to their use in feed and food.

The underground resource of petroleum is localized in special regions of the world and thus the availability of petroleum-based carbon source is also restricted to the area where petroleum is produced. Furthermore, the amount of underground fossil carbon source is limited and human can not depend on the petroleum-based SCP forever even if it is produced economically and accepted as feed and food material. In contrast, the fish-respiration based microalgal SCP may be produced everywhere without worrying about the ultimate exhaustion of carbon resource.

On the other hand, the oxygen liberated through the photosynthetic reaction of the microalgal in the water will, in turn, be utilized by the fishes for their respiration. This will reduce the aeration cost for fish production substantially. The level of dissolved oxygen in the symbiotic culture pond may be controlled by adjusting several factors: microalgal density, intensity and duration of illumination, and the density of fishes.

Ammonia is known to be extremely toxic to fishes. Ammonia is the primary excretory product of fishes, of the total microgenous excretion 90% is in the form of ammonia (Moyle and Cech, 1988). This fact limits the fish density in the culture pond. Ammonia is a good nitrogen source for microalgal growth and will be assimilated by the organisms without allowing time to accumulate in the water. Therefore, by growing fishes with high density of microalgae the yield of fishes of the culture pond may be increased.

In mass production of microalgae using outdoor open ponds overgrowth of protozoa in the culture water creates serious problem. This type of problem can be solved by the predatory activity of fishes in the symbiotic culture. Swimming activity of fishes in the symbiotic culture may replace energy consuming mechanical agitation of the culture water reducing production cost of microalgae further. Further reduction of algal production cost will be also possible by employing filamentous microalgae which can be harvested and dried at lower costs compared to that for non-filamentous microalgae. The increased pond depth by localizing filamentous microalgae in the upper water zone allows greater yield of fishes from the same size of land.

Loaches were selected as fishes for the symbiotic culture because they are easy to grow specially for the laboratory-scale experiments. Eels and Tilapia sp. were also used for experimental symbiotic cultures to represent commercial fishes.

Microalgae of non-filamentous type were obtained from nature by growing loaches in open flasks exposed to sunlight. In about 10 days the water in the flasks turns to deep green. Microscopic examination revealed that the microflora was predominated by Chlorella sp. with small portions of Scenedesmus sp. and Palmellococcus sp. Filamentous microalgae were collected from a stream flowing in the vicinity of Seoul city. After a symbiotic culture with loaches in flasks for about 10 days replacing water everyday, species belonging to Spirogyra, Edogonium, Vaucheria, and Oscillatoria, predominated by Spirogyra sp. were observed.

The invention will be more clearly illustrated with reference to the following examples.

EXAMPLE 1

Erlenmeyer flasks of 3l capacity were used as culture vessels. The symbiotic culture was initiated by transferring 2.0l of Chlorella suspension having optical density at wave length of 600 nm (OD600) of 0.30 together with approximately 100g of loaches. The final water volume was adjusted to 2.5l with tap water. Duplicate flasks were set at windowside of the laboratory for 30 days. Neither artificial illumination, nor temperature control were applied. The water temperature was observed to be varied during the culture period within the range of 22 to 32° C. The loaches in each flask were fed three times a day, at 9:00, 13:00 and 17:00, with 0.5g each of the formulated feed. The growth of the algae was measured by reading OD600 values. When the OD600 value reached the level of 0.60 to 0.80, one half volume (1.25l) of the culture solution was replaced with fresh tap water recording the dry weight of algal biomass (calculated from the OD600 values) contained in the harvested culture water.

At the end of the 30-day culture, the average total algal biomass produced was recorded as 9.6g (dry weight) and loach weight gained as 19.9g (fresh weight).

EXAMPLE 2

A scale-up culture was performed using a concrete pond having sunlight exposure area of 1 m2 [=1 m ×1 m) constructed on the roof of the the institute building. The pond was filled to 0.3m depth to make 300l working volume with Chlorella suspension havin OD600 value of 0.30. The symbiotic culture was started by inoculating with 12 kg loaches. The loaches were fed three times a day with 60 g each of the formulated feed. On raining or cloudy days when the algal photosynthesis is not active, the feeding was reduced to one or two times a day to avoid undue pollution of water. During the culture period the water temperature varied between 17° C. and 25° C. Measurement of the growth and harvesting biomass of the microalgae were done as described in example 1. During the 30-day culture, 674 g of dry algae was produced and fresh weight of the loaches was gained by 2,350g.

EXAMPLE 3

A square pond of 1 m ×3 m bottom and 1.3 m depth was constructed with cement blocks in the ground exposing 0.3 m height in the air forming a square wall on the top of the soil surrounded 1 m - deep pond. Inside of the pond was lined with vinyl film and filled with 3,000l of water to make 1 m - depth. The water was then separated into two zones, a 0.3 m - deep upper zone with about 900l of water and a 0.7 m - deep bottom zone with about 2,100l of water by submerging horizontally a 20-mesh nylon net except its four edges which are exposed to the air and supported by the square wall of the pond. The nylon net partition in the water makes filamentous algae stay in the upper zone and receive light effectively, allowing the dissolved gases and minerals pass freely between the two water zones. Such arrangement increases the unit area productivity of the biomasses also. The pond was provided by pipe lines to supply fresh water and remove used water. An air sparger was also installed to supply compressed air when needed. Three identical ponds, No. 1, No. 2, and No. 3, were constructed and three experimental cultures were carried out simultaneously in the ponds.

Into the upper zone of the pond No. 1, 40 kg of loaches and 4.5 kg (fresh weight) of the filamentous microalgae were inoculated, while into the bottom zone, 80 kg of loaches alone were released. The loaches in both water zones were fed three times a day with 600 g each of formula feed. The feeding rate was reduced to once or twice in a rainy or cloudy day. When the photosynthetic activity was ceased in the sunset, the nylon net was raised above the water and a part of the algal biomass was harvested by grabbing with hands and then the net was returned to the water. When the algal growth was poor in rainy or cloudy days, the amount of daily algal harvesting was reduced or harvesting was skipped to maintain the microalgal density in the culture pond high. When the harvesting was completed, fresh water with high dissolved oxygen was started to flow into the pond to replace the used water. The flow rate was adjusted to complete the replacement before the sunrise. The harvested filamentous microalgal biomass was dried in the nylon net exposing to the sunlight or wind. The water temperature during the culture period was maintained at 25° C. ±5° C. After 30 days the following results were obtained.

Algal biomass produced ---------- 2,150 g (dry weight)
Loach weight gained -------------- 25,210 g (fresh weight)
Formula feed supplied ------------ 49,310 g (dry weight)

EXAMPLE 4

Into the water of the 900l upper zone of pond No. 2, 40 kg of loaches and 4.5 kg (fresh weight) of the filamentous microalgae were inoculated and the loaches were fed three times a day with 200 g each of formula feed. Into the 2,100l bottom zone, 80 kg of eels were released and fed with 1,200 g of the formula feed once a day in the sunset after the filamentous microalgae in the upper zone were harvested. The amount of daily feed was reduced keeping pace with the eel's uptaking activity. The microalgal biomass grown in the upper zone was harvested and dried as described in example 3. The replacement of used water with fresh water was also performed every night as in example 3. When needed, aeration of the water with compressed air was also performed. The results of 30-day culture are as follows.

Algal biomass produced ------------ 1,970 g (dry weight)
Eel weight increased -------------- 17,360 g (fresh weight)
Loach weight gained ---------------- 6,640 g (fresh weight)
Feed supplied --------------------- 45,340 g (dry weight)

EXAMPLE 5

In the upper zone of pond No. 3, the culture of filamentous microalgae and loaches was prepared and carried out as described in examples 3 and 4, together with 80 kg of Tilapia sp. in the bottom zone: The Tilapia sp. was fed three times a day with 400 g each of formula feed. The methods of harvesting algal biomass and replacement of water were described in examples 3 and 4. The following results were obtained after 30 days of culture.

Algal biomass produced ------------- 1,560 g (dry weight)
Tilapia weight gained -------------- 16,740 g (fresh weight)
Loach weight gained ---------------- 7,120 g (fresh weight)
Formula feed supplied -------------- 47,250 g (dry weight)

What is claimed is:

1. A method for producing microalgae and fish biomass in commercial quantities through symbiotic co-culture, said method comprising continuously co-culturing microalgae and fish in high density in a body of water which is exposed to sunlight or artificial illumination, the density of said microalgae in said water being sufficient to supply the oxygen requirements of said fish, and to assimilate nitrogen excreted therefrom sufficient to prevent a level toxic to said fish from developing said microalgae density being at least 0.3 g (dry weight)/1, the density of said fish in said water being sufficient to supply the carbon dioxide and nitrogen requirements of said microalgae for optimal growth, and sufficient to prevent protozoal contamination, said fish denisty being at least 30 g/1, said microalgae and said fish being periodically harvested from said water thereby maintaining said density of said microalgae and said fish.

2. The method of claim 1, wherein said fish comprise one or more species having commercial value.

3. The method of claim 1, wherein the depth of said body of water is less than about 0.4 m, and said microalgae are filamentous or non-filamentous.

4. The method of claim 1, wherein said periodic harvesting of said microalgae comprises the process of centrifugation or sedimentation.

5. The method of claim 1, wherein said fish are supplementally fed with a formula feed to support the growth of said fish and to optimize carbon dioxide production therefrom.

6. A method for producing microalgae and fish biomass in commercial quantities through symbiotic co-culture, said method comprising continuously co-culturing filamentous microalgae and fish in high density in a body of water 1.0 to 1.5 m-deep which is exposed to sunlight or artificial illumination, said body of water being divided into two zones, a 0.3 m-deep upper zone in which said filamentous microalgae and said fish are grown together, and a 0.7 - 1.2 m-bottom zone in which only said fish are grown, said two zones being divided by a net which is submerged horizontally in said water, the density of said microalgae in said water being sufficient to supply the oxygen requirements of said fish, and to assimilate nitrogen excreted therefrom sufficient to prevent a level toxic to said fish from developing, said density in said upper zone being maintained at least at about 0.3 g (dry weight)/l, the density of said fish in said water being sufficient to supply the carbon dioxide and nitrogen requirements of said microalgae for optimal growth, and sufficient to prevent protozoal contamination, said density being at least 30 g/l, said microalgae and said fish being periodically harvested from said water, thereby maintaining said density of said microalgae and said fish.

7. The method of claim 6, wherein said filamentous microalgae are harvested by raising said net and transferring said microalgae therefrom.

8. The method of claim 6, wherein said fish are supplementally fed with a formula feed to support the growth of said fish and to optimize carbon dioxide production therefrom.

* * * * *

UNITED STATES PATENT AND TRADEMARK OFFICE
CERTIFICATE OF CORRECTION

PATENT NO.  : 5,040,486
DATED       : August 20, 1991
INVENTOR(S) : PACK, Moo Young It is certified that error appears in the above-identified patent and that said Letters Patent is hereby corrected as shown below:

On title page item [21]:

Change Application number from "452,391"

to --452,394--.

Signed and Sealed this

Nineteenth Day of January, 1993

Attest:

DOUGLAS B. COMER

Attesting Officer     Acting Commissioner of Patents and Trademarks